United States Patent [19]
Fleming

[11] Patent Number: 5,584,256
[45] Date of Patent: Dec. 17, 1996

[54] TOOL FOR PLACEMENT OF AMASSED GRANULAR FERTILIZER IN SOIL

[76] Inventor: Thomas E. Fleming, 1144 16th Ave., Clarkston, Wash. 99403

[21] Appl. No.: 473,045

[22] Filed: Jun. 6, 1995

Related U.S. Application Data

[63] Continuation-in-part of Ser. No. 188,894, Jan. 31, 1994, abandoned.

[51] Int. Cl.$^6$ .................................................. A01C 11/02
[52] U.S. Cl. ........................ 111/92; 111/95; 222/163; 222/175; 222/564; 222/608
[58] Field of Search ........................... 111/92, 106, 7.1, 111/89, 95, 96; 222/175, 608, 163, 564

[56] References Cited

U.S. PATENT DOCUMENTS

| | | |
|---|---|---|
| 552,432 | 12/1895 | Gordon . |
| 909,289 | 1/1909 | Grisell et al. . |
| 1,720,601 | 7/1929 | Kalenoff . |
| 2,860,586 | 11/1958 | Nozell . |
| 3,014,443 | 12/1961 | Keyser et al. . |
| 3,749,034 | 7/1973 | Berggius et al. . |
| 4,444,131 | 4/1984 | Marttinen . |
| 5,052,314 | 10/1991 | Lemni . |
| 5,170,729 | 12/1992 | Benner . |

Primary Examiner—Terry Lee Melius
Assistant Examiner—Christopher J. Novosad
Attorney, Agent, or Firm—Keith S. Bergman

[57] ABSTRACT

A tool, for placement of predetermined amounts of granular fertilizer into the soil in a consolidated mass, provides an elongate body with a handle structure in its upper portion and a tubular fertilizer reservoir in its lower portion. The fertilizer reservoir defines an open upper portion for filling and slidably carries an associated tube for adjustment of the volume of a fertilizer charge. An angulated bottom portion of the reservoir allows insertion into the earth and carries a pivotally articulated cover to allow opening of the bottom portion of the reservoir for dispersement of a fertilizer charge. The lower medial portion of the tool body provides a pivotally mounted foot support to aid insertion of the fertilizer reservoir into the earth. Dispersement structure communicates from the pivotally articulated reservoir cover to the handle structure for opening of the cover from the handle area for dispersement of fertilizer.

8 Claims, 3 Drawing Sheets

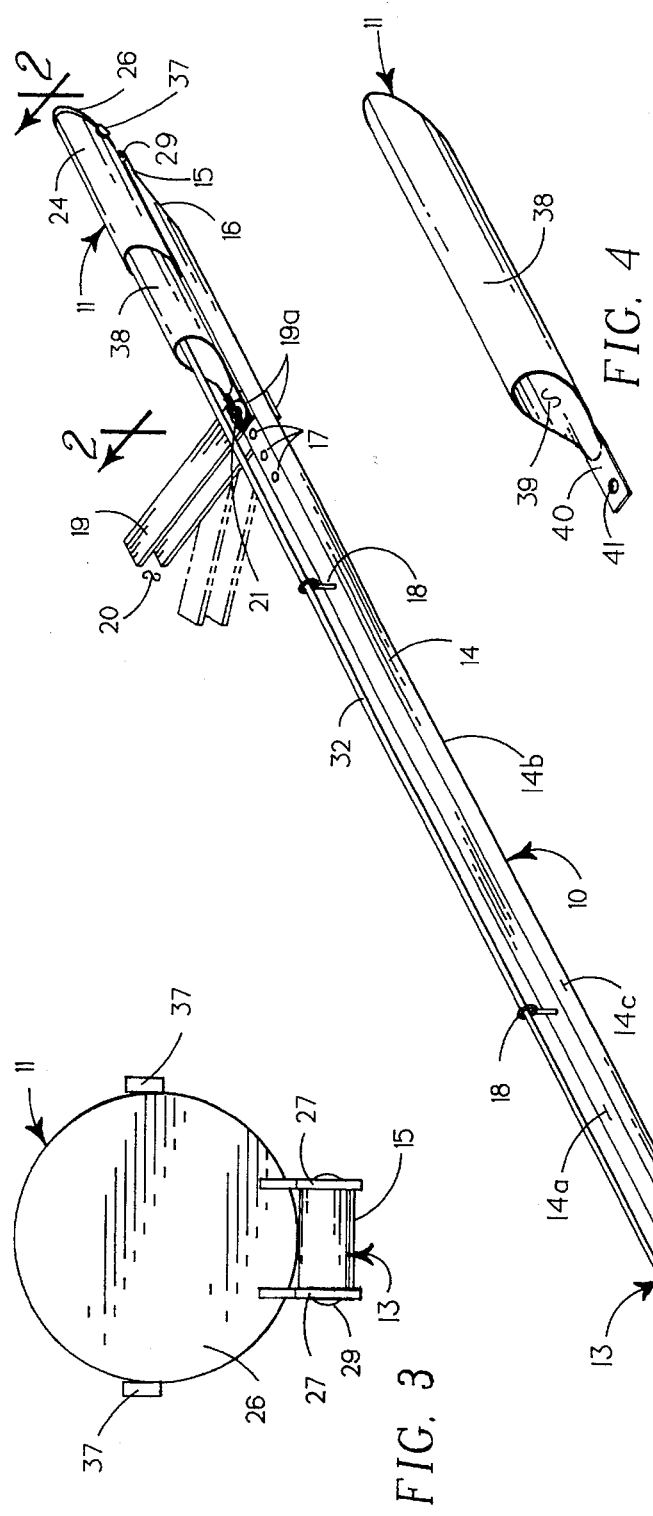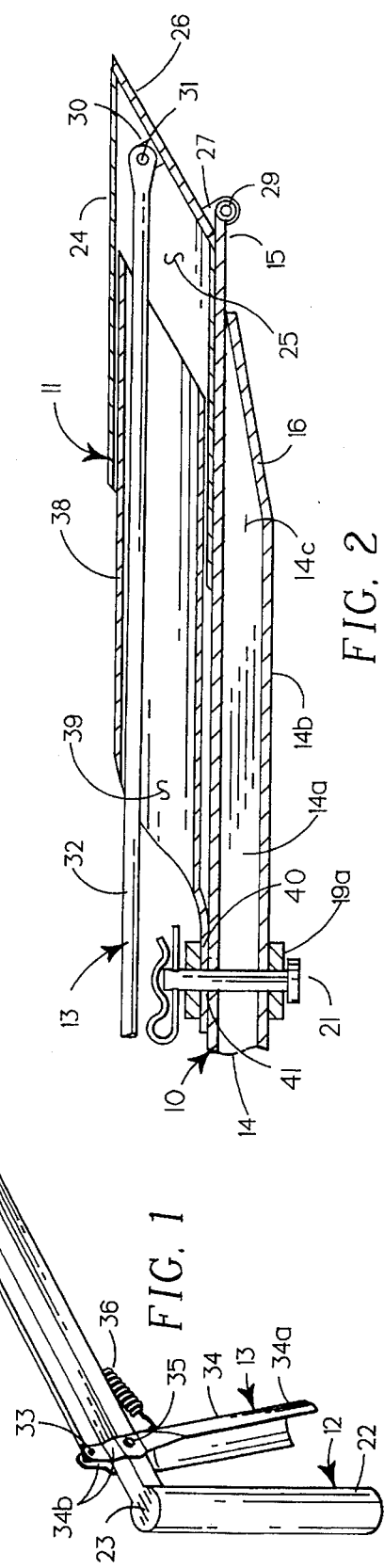

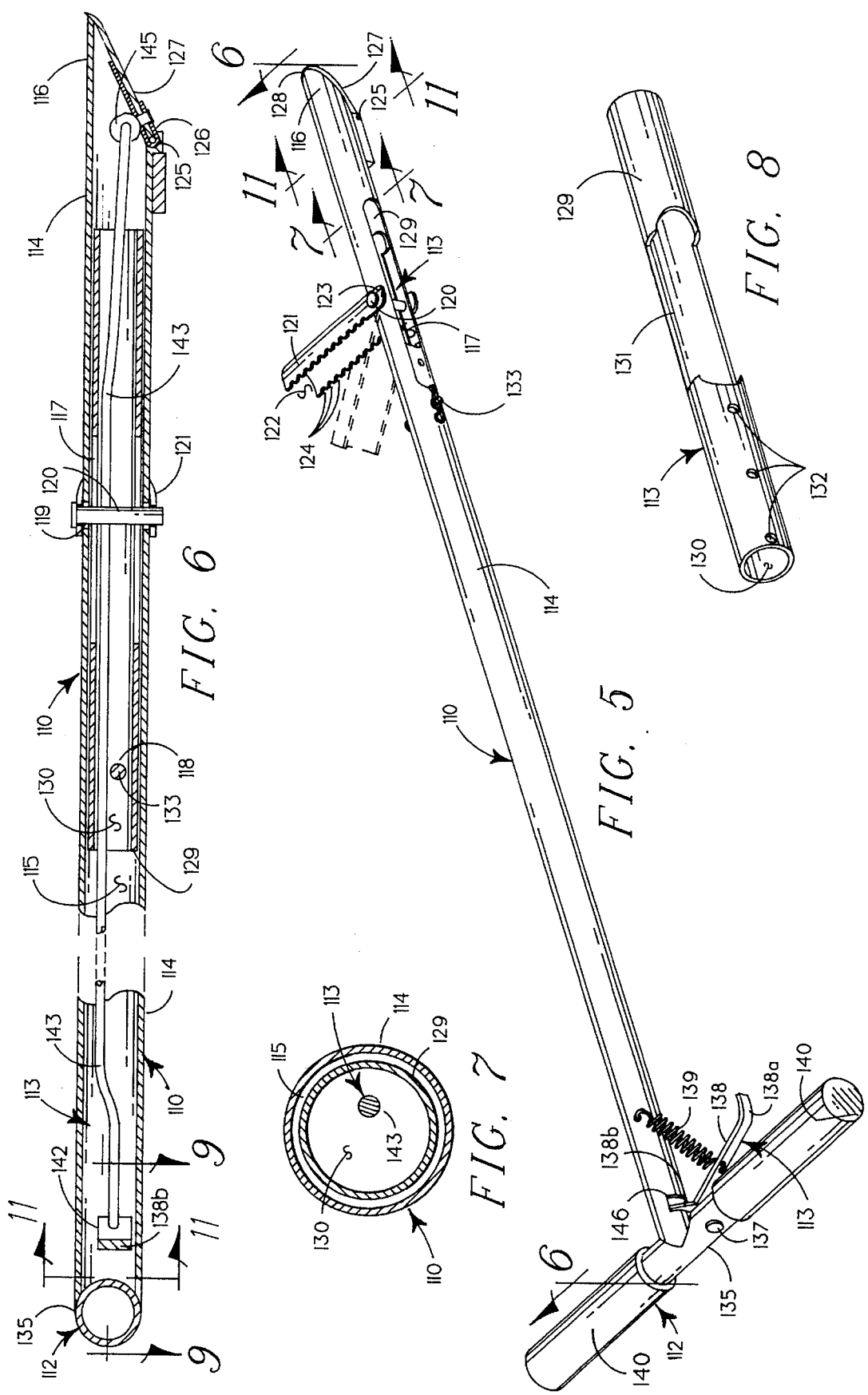

TOOL FOR PLACEMENT OF AMASSED GRANULAR FERTILIZER IN SOIL

RELATED APPLICATIONS

This is a continuation in part of an application filed Jan. 31, 1994 under Ser. No. 08/188,894 and now abandoned.

BACKGROUND OF INVENTION

1. Field of Invention

This invention relates generally to tools for the placement of fertilizer in soil, and more particularly to a manually operated hand tool to deposit a predetermined quantity of granular fertilizer in an associated mass in a hole created by the tool in soil.

2. Background and Description of Prior Art

It has become popular in ornamental horticulture to place discrete quantities of fertilizer in the earth for use by individual plants as opposed to general, somewhat homogeneous application of fertilizer over broad areas as is common in field horticulture for the propagation of botanical materials that usually are of the same type and occupy larger areas. In the recent past in placing such fertilizer it has become popular to use a consolidated fertilizer mass that has been formed into the shape of a stake with a pointed end that may be driven into the earth at the place desired for fertilizer application to thereafter disperse its fertilizer components into the surrounding soil. Such fertilizer stakes are simple and easy of use, but they are somewhat difficult to form so that they maintain their configuration to withstand physical forces placed upon them prior to and during placement and yet provide an appropriate release of the fertilizer materials from which they are formed or which they carry. Fertilizer stakes also are relatively expensive, often costing several times the amount of a similar quantity of dry, granular fertilizer containing the same amount of botanical nutrient material. The present invention seeks to provide a tool for placement of an associated mass of bulk, dry, granular fertilizer into the soil so that the granular material may be used in a fashion similar to fertilizer stakes at substantially lower cost for an equal amount of plant nutrients of the same availability.

Various hand tools for placement at a particular location of various material in and beneath the soil, especially seeds, other propagative plant material and fertilizer, have heretofore become known. To be practically useful, such tools must be easily insertable into the earth and this generally requires that a lower portion of the device that first contacts the earth be of a sharp or pointed nature to aid entry and moving soil out of the path of the tool as it moves therethrough. Various prior art devices have not provided a well defined, sharp lower portion, and especially a lower end that is of an acutely angulated wedge configuration to make insertion easy and allow its accomplishment with a minimum of force, to distinguish such tools from the acutely angulated wedge shape of my tool.

The force required for tool insertion into soil often is greater than can be reasonably accomplished by manual means. Prior tools have provided various foot supports, usually of a fixed nature, to allow a user's foot to aid insertion of the tool into soil. In distinction from such prior tools my tool provides a foot support that is pivotally mounted to allow it to be extended from a first storage position immediately adjacent the tool body to a second use position perpendicular to the tool body. This pivotal foot support gives the tool a more compact configuration in a storage mode or when the foot rest is not used and its positioning limits or allows determination of the depth of insertion into soil.

My tool defines a fertilizer reservoir that has a lower angulated portion carrying a pivotally mounted door that may be opened by interconnecting mechanical linkage operatively carried in the handle area in the upper portion of the tool. Other tools have provided pivotally openable bottom doors, but during placement in the earth of such prior tools it has been common that the door may be moved laterally and askew of its pivotal axis by reason of non-symmetrical forces caused on the door, as by irregularities in the earth at the place of insertion or the type of manipulation of the tool by a user. If this occurs, the door mounting structure may be damaged and ultimately rendered inoperative or broken. My tool differs from such prior devices by providing in a first species a door having a piano-hinge type mounting of some length and in a second species having side supports on each side of the door to extend upwardly about the adjacent reservoir portion to prevent the door from skewing or otherwise moving laterally to prevent damage to door mounting structures to make the door more durable and its operation more reliable.

it is desirable in a tool for the placement of granular fertilizer that predetermined amounts of fertilizer may be placed and that these predetermined amounts may be varied. Prior tools have often not provided means for measurement of material to be placed or those that have allowed such measurement often have not allowed variation of the measurement. The instant tool provides a material reservoir that carries only a single measured quantity of material to be placed at a single location, and in so doing, provides a compound reservoir with an adjustably movable sleeve to allow variation of reservoir volume while still allowing the reservoir to be easily filled from its upper portion by placing it in a bulk supply of granular material.

My invention lies not in any one of these features individually, but rather in the synergistic combination of all of its structures that necessarily give rise to the functions flowing therefrom as herein specified and claimed.

SUMMARY OF INVENTION

My tool generally provides an elongate rigid body having a reservoir at its lower end and a handle at its upper end. The reservoir is a tubular structure with an open upper portion for filling and an angulated, wedged shaped bottom portion, covered by a door pivoted at its upper edge for opening away from the lower wedge apex for material deposition. An adjustably extendable sleeve is carried in the reservoir channel to provide an adjustably determinable volume for the reservoir. The lower medial portion of the body carries a foot support that is pivotal from a storage position against the body to an operative position perpendicular to the body, whereat a user's foot may apply force to aid insertion of the wedge shaped bottom portion into the earth. A dispersement rod communicates from pivotal interconnection with the medial portion of the reservoir door upwardly through the reservoir to a position spacedly adjacent the handle to there pivotally interconnect with an activating lever pivotally mounted on the tool body to cause vertical motion of the rod to open and close the reservoir door. The reservoir door is biased to a closed position by a spring extending between the activating lever and the tool body. In one species, guides maintain the reservoir door in aligned position on the wedge shaped bottom portion of the reservoir of my tool.

In providing such a device, it is:

A principal object to create a hand tool to place a predetermined quantity of granular fertilizer beneath the soil and there deposit the material in a consolidated mass.

A further object is to provide such a tool that has a reservoir structure in its lower portion that may be filled by placement in a bulk supply of granulated fertilizer to carry variable predetermined volumes of granular fertilizer for placement.

A further object is to provide such a tool that has a lowermost fertilizer reservoir with an angulated wedge-shaped bottom portion defining an orifice that is covered by a door that pivots in its upper portion to open from the lower wedge apex for deposition of material and may be maintained in alignment relative to the lower reservoir structure of the tool by its pivot structure or alignment dogs.

A further object is to provide such a tool that has a foot support mounted in its lower medial portion to pivot from a storage position against the elongate tool body to a foot supporting use position perpendicular to the tool body to aid tool insertion in soil and limit or measure depth of tool penetration in the soil.

A still further object is to provide such a tool that has a dispersement rod communicating upwardly from the lower reservoir door to the handle area where it may be moved by an activating lever to open and close the reservoir door.

A still further object is to provide such a tool that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement with only preferred and practical embodiments of the best known modes being illustrated in the accompanying drawings as required.

BRIEF DESCRIPTION OF DRAWINGS

In the accompanying drawings which form a part hereof and wherein like numbers of reference refer to similar parts throughout:

FIG. 1 is an isometric side view of a first species of my tool showing its various parts their configuration and relationship.

FIG. 2 is a partial, enlarged, vertical cross-sectional view through the reservoir and lower body portion of the tool of FIG. 1, taken on the line 2—2 on that Figure in the direction indicated by the arrows thereon.

FIG. 3 is an enlarged orthographic bottom view of the tool of FIG. 1, taken from the right end of FIG. 1.

FIG. 4 is an isometric surface view of the reservoir extension tube of the tool of FIG. 1 removed from the tool to better illustrate its general configuration.

FIG. 5 is an isometric side view of a second species of my tool particularly adapted for economic manufactures, showing its parts their configuration and relationship.

FIG. 6 is a partials vertical cross-sectional view through the tool of FIG. 5, taken on line 6—6 on that Figure in the direction indicated by the arrows thereon.

FIG. 7 is an enlarged vertical cross-sectional view through the lower body of the tool of FIG. 5, taken on the line 7—7 thereon in the direction indicated by the arrows.

FIG. 8 is an enlarged isometric view of the measuring tube of the tool of FIG. 5, removed from the tubular body to better show its configuration.

DESCRIPTION OF THE PREFERRED EMBODIMENT

Figure 11:
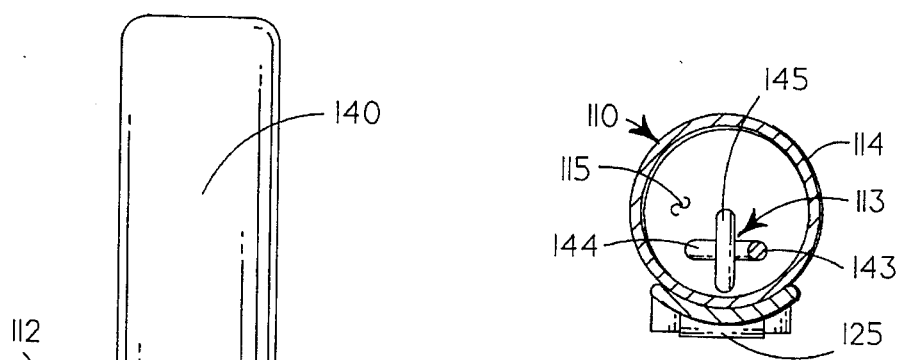
FIG. 11 is an enlarged, vertically transverse cross-sectional view of the reservoir door mounting structure, taken on the line 11—11 on FIG. 5 in the direction indicated by the arrows.

My tool generally provides elongate body 10 having reservoir 11 in its lower portion and handle 12 in its upper portion, with dispersement mechanism 13 communicating between the handle area and the reservoir structure.

In the first species of my invention illustrated in FIGS. 1–4, body 10 provides elongate rigid beam 14, in the instance illustrated comprising a square tube. The lower portion of the body beam is tapered in a forward or downward direction to provide a minimal cross-sectional area at its outermost edge portion 15 with the transitional portion 16 angulated to provide a wedge configuration with downward facing apex that allows insertion into the earth with minimal force. The portion of beam 14 spacedly upward from transitional portion 16 defines plural spaced fastener holes 17 communicating through beam front 14a and back 14b to receive fasteners associated with an adjustment tube of the reservoir structure for positional maintenance of the adjustment tube relative to the body. Front 14a of the body beam structurally carries plural forwardly extending and axially spaced dispersement rod guides 18 defining eyes in their outer forward portions to slidably support a dispensing rod of the dispersement mechanism.

The lower medial portion of beam 14 pivotally carries foot support 19, which in the instance illustrated comprises a "U" shaped channel element with its channel 20 opening upwardly. Channel 20 is incrementally larger than the outer dimension between sides 14c of beam 14 and the inner end portion of the back of the foot support is removed to define opposed ears 19a to allow pivotal mounting which extend over front 14a and the support foot on the beam 14. Fastener in the instance illustrated comprising a removable pin, extends through holes defined in side ears 19a and the holes 17 defined in the opposed front and back of the body beam to pivotally interconnect the foot support to the body beam and allow its motion from a first stored position with the body beam 14 in channel 20 to a second extended position substantially perpendicular to the beam. The foot support is so configured that it is maintained in a perpendicular position by the back of the channel element of which it is formed, so that the foot support may not pivot downwardly past the horizontal when body 10 is vertical.

The overall length of body beam 14 is such that its upper handle structure may be conveniently manipulated by a standing user to insert the lower portion of the tool into soil therebeneath. This numerically requires a length in the range of thirty to forty inches for most adult users and preferably one approximating thirty-six inches. The cross-sectional shape and size of beam 14 is not critical to my invention, but should not be greater than necessary to provide the strength and rigidity required of the element to make the tool as light and easy to handle as possible. Preferably the body beam is formed of metal such as a mild steel to provide appropriate rigidity and durability, though harder plastic materials and softer metals may also be used, especially for use in looser soil.

The length of the foot support 19 is not critical, but should be such as to properly support the sole of the shoe of a user, which numerically requires a length of approximately four and one-half inches. The foot support is preferably formed of the same material as the body to provide the rigidity required of the element and reasonable durability.

Handle 12 provides cylinder 22 extending perpendicularly from structural interconnection with body beam 14 at its upper end portion, and in the tool illustrated in FIG. 1 also perpendicular to the foot rest. Cylinder 22 is of tubular form to lessen its weight, is provided with structurally interconnected ends 23 to keep debris out of its channel, and is preferably formed of metal for appropriate rigidity and durability, though its configuration and material of formation are not critical so long as the handle provides a rigid means for grasping. The cylinder 22 preferably has an external diameter of approximately one inch and an axial length of approximately five inches for average comfortable and convenient use.

Reservoir 11 is formed by reservoir tube 24 with parallel angulated ends defining an acute included angle of approximately thirty degrees to the cylinder side. The reservoir tube is structurally carried by the front surface 14a of body beam 14 in an axially parallel relationship, with the uppermost portion at the lower end of the tube spacedly above the lowermost portion 15 of body beam 14.

The reservoir tube 24 defines medial channel 25, the lower orifice of which is covered by planar reservoir door 26, which has an elliptical peripheral configuration the same as the lower surface of the reservoir tube. The reservoir door in the upper portion of its lower surface, adjacent the lower end portion of body beam 14, structurally carries spaced, perpendicularly extending mounting brackets 27, which are so positioned as to extend adjacent to the sides of the lower portion 15 of the body beam 14, Hinge 29 carried by the lower portion 15 of the body beam provides a medial mounting pin that pivotally extends through the hinge and through mounting dogs 27 to pivotally mount the reservoir door 26 on the lower end portion 15 of the body beam, so that the door may be pivoted from a first position covering the lower orifice of the reservoir tube to a second position opening that orifice at its lower apex.

The periphery of reservoir door 26, on its sides in a medial position between the upper and lower portions, carries paired opposed alignment dogs 37, These alignment dogs extend a spaced distance upwardly from the reservoir door and immediately outwardly adjacent the outer surface of the reservoir tube 24, The dogs 37 maintain the reservoir door in properly aligned position covering the lower orifice of the reservoir tube to prevent skewing of the door relative to the tube, which might cause deformation of the hingeable mounting structure and disrupt the pivotal motion of the door or possibly break the mounting structure.

Reservoir tube 24 carries in its internal channel 25 reservoir extension tube 38 that defines internal channel 39. The outer surface of the reservoir extension tube 38 is of similar configuration and incrementally smaller size than channel 25 of the reservoir tube 24, so that the extension tube is slidably carried in channel 25. The lower portion of the reservoir extension tube is of angulated configuration similar to the lower portion of reservoir tube 24 to allow maximum extension of the tubes relative to each other without having an opening therebetween when the two elements remain in contact. The upper portion of reservoir extension tube 38, on its rearward side adjacent the front 14a of body beam 14, provides upwardly extending fastening tab 40 defining fastening hole 41 in its upper, laterally medial portion. The fastening tab is so configured that fastener 21 may extend through hole 41 in the fastening tab and through any of holes 17 in the body beam to positionally maintain the reservoir extension tube relative to the reservoir tube while at the same time fastening the foot support, as illustrated in FIGS. 1 and 2. The positioning of the reservoir extension tube 30 relative to reservoir tube 24 will determine the total volume of material containable within reservoir chamber 25 and extension chamber 39 and thusly the amount of material dispersed by my tool. The material from which the reservoir extension tube is formed is not critical so long as it is rigid enough to fulfill its purpose, but it should be such as to maintain as low weight as practical for the tool.

The upper surface of reservoir door 26 structurally carries perpendicularly extending dispersement rod fastening dog 30. This fastening dog 30 defines a medial hole to accept fastening pin 31 which pivotally mounts the lower end portion of dispersement rod 32 to the fastening dog 31. Dispersement rod 32 is an elongate element communicating from the fastening dog 31 upwardly, spacedly adjacent body beam 14, to pass through dispersement rod guides 18 carried by the body beam 14 and extend to a position spacedly below handle cylinder 22. The dispersement rod 32 has a somewhat flattened lower end portion to aid support of the pin fastener 31 and has sufficient rigidity that elongate motion of the rod will be transmitted to reservoir door 26 to pivotally move that door responsive to lineal motion of the dispersement rod.

The upper end portion of dispersement rod 32 is somewhat flattened and defines a hole to pivotally receive pin fastener 33 carried by the forward end portion of dispersement lever 34. The dispersement lever provides curved handle portion 34a of semi-circular cross-section, with spaced fastening ears 34b extending forwardly therefrom to fit over body beam 14. The fastening ears 34b in their inner portions define pivot pin holes to cooperate with similar aligned holes defined between the sides 14c of the body beam to receive fastening pin 35 therethrough to pivotally mount the dispersement lever on body beam 14 spacedly below handle cylinder 22. The outer or forward portions of fastening ears 34b define opposed cooperating holes to carry pin fastener 33 that pivotally interconnects the fastening ears to the dispersement rod 32. Extension spring 36 extends between the adjacent surfaces of the dispersement lever and back 14b of the body beam to bias the rearward end of the dispersement lever away from handle cylinder 22 and thusly bias the reservoir door 26 to a closed position. With this dispersement mechanism, reservoir door 26 may be moved from a closed to an opened position by manually moving the dispersement handle 34 against its bias toward body handle 12.

Figure 9:
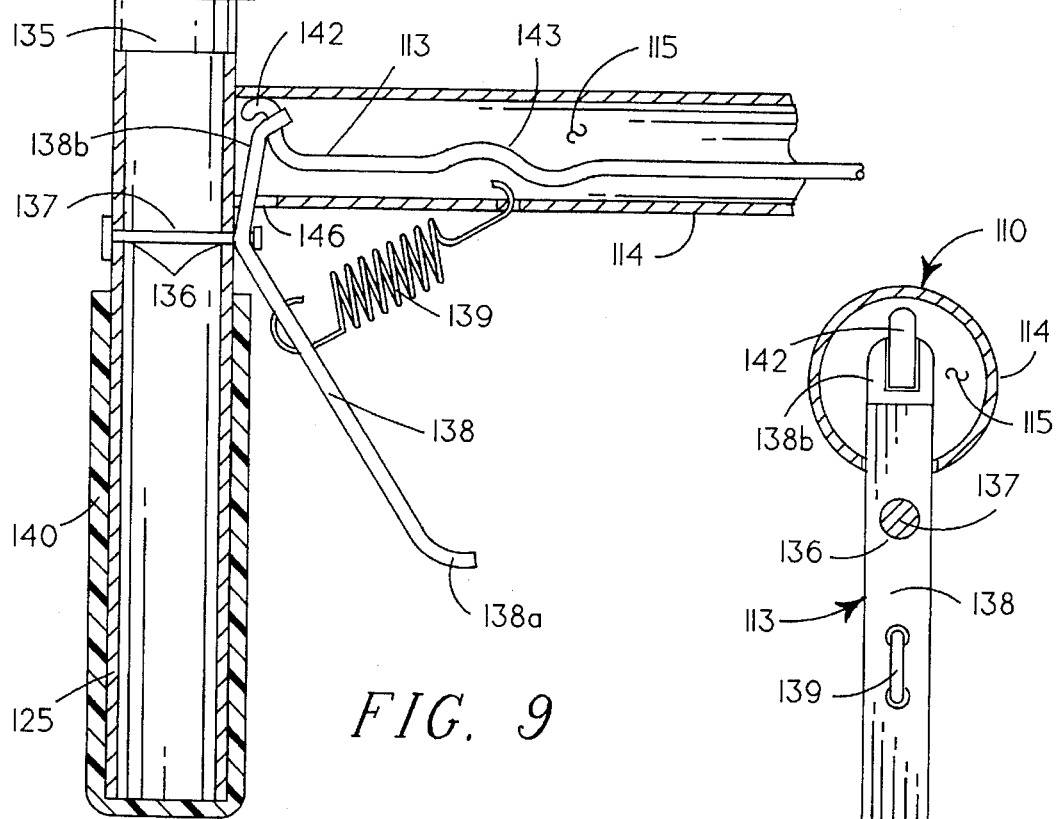
FIG. 9 is a horizontal cross-sectional view through the handle structure of the tool of FIG. 6, taken on the line 9—9 thereon in the direction indicated by the arrows.
Figure 12:
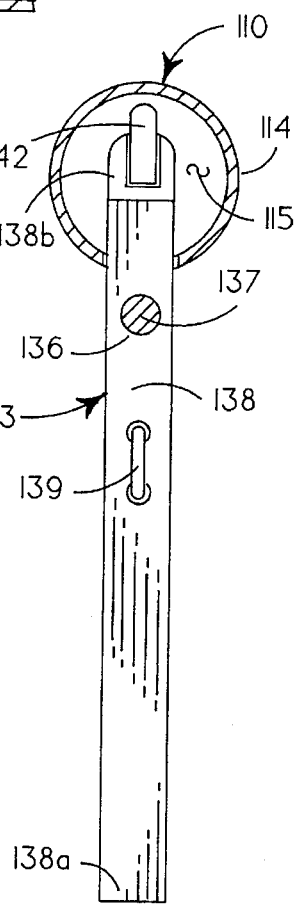
FIG. 12 is an enlarged, vertically transverse cross-sectional view through the body at the area of the handle structure, taken on the line 12—12 on FIG. 6 in the direction indicated by the arrows thereon.
Figure 10:
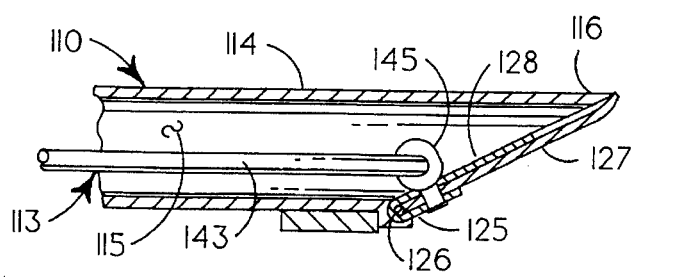
FIG. 10 is an enlarged illustration of the lower right end portion of FIG. 6 to show that portion in more detail.

A second species of my invention that is well adopted for economical manufacturing is illustrated in FIGS. 5–12. This second species provides elongate cylindrical body 110 embodying a reservoir structure in its lower portion, with handle 112 structurally carried in its uppermost portion and dispersement mechanism 113 communicating between the handle area and the reservoir portion of the lower cylindrical body.

Body 110 is formed by cylindrical body tube 114 defining internal channel 115. The lower end portion 116 of the body lube terminates on an angulated plane that forms an acute angle with the body side, similar to the bottom portion of the reservoir tube of the first species, to provide a lower orifice for material dispersement. The lower medial portion of the body tube 114 defines elongate reservoir window 117 extending upwardly from a point spacedly above the lower end portion. Hole 118 is defined through the body tube, spacedly above the upper extension of the reservoir window, to receive a positioning pin to positionally maintain a reservoir adjustment sleeve in the body tube channel.

The body tube 114 defines a diametrically extending hole 119 adjacent the medial portion of the reservoir window and extending in a forward-rearwardly orientation perpendicular to the body tube axis to receive mounting pin 120 to pivotally mount foot support 121 on the body tube. The foot support 121 in this instance is an elongate member of half cylindrical cross-section defining channel 122 that is incrementally larger than the external diameter of the body tube 114 so that the foot support may pivot thereagainst for storage. The foot support 121 provides similar paired opposed ears 123 that define cooperating holes to pivotally accept mounting pin 120 that extends therethrough. The ears 123 and holes defined in them are so configured that the foot support will pivot from an upward storage position immediately adjacent the body tube to a lowermost operative position extending perpendicularly to the body tube, as illustrated in FIG. 5. The upper edges 124 of the foot support preferably are serrated to provide better positional maintenance for the sole of a user's shoe thereon.

The external surface of the lower portion of the body tube 114, upwardly adjacent the uppermost portion of the lower orifice, structurally carries gate bracket 125 supporting door pin 126, extending in a plane parallel to the plane defining the lower cylindrical orifice, to pivotally mount door strap 128 on the upper portion of door 127. The door 127 is of an elliptical peripheral shape and tapers to a sharp edge about its lowermost apex portion. The door is so dimensioned and configured as to cover, and be coextensive with, the external surface of the lower end portion of the body tube when in a closed position. Door pin 126 has some lineal extent to provide sufficient strength and rigidity to maintain the lower orifice door 127 in proper position during use, so as not to require additional supports for positional maintenance as disclosed for the first species of my tool.

This second species of tool provides no separate reservoir structure, but rather incorporates that structure as a part of the lower portion of the tool body itself by using channel 115 as a reservoir. Cylindrical adjustment tube 129 is provided to regulate the amount of fertilizer contained by and discharged from the reservoir. This tube 129 defines internal channel 130 and has an external shape similar to and diameter incrementally smaller than body tube channel 115 so that the adjustment tube slides in the body tube channel. Part of the medial portion of the adjustment tube is cut away to leave only a narrow connecting portion 131 so that granular fertilizer may enter into the adjustment tube channel 130 through reservoir window 117 defined in the body tube. The upper portion of the adjustment tube defines axially spaced adjustment holes 132 to receive adjustment pin 133 carried in holes 118 defined in the body 110 to allow adjustable positioning and positional maintenance of the adjustment tube within the body tube channel. It is to be noted that the adjustment tube may be moved in an axial direction relative to the foot support pivot pin 120, so long as that pin remains within the medial removed portion of the adjustment tube.

Handle structure 112 provides handle cylinder 135 structurally interconnected with the upper portion of body tube 114, extending on each side of the body tube parallel to the foot support, and covered in its outer parts by resilient grips 140. Operating lever bolt hole 136 is defined through the side of the handle opposite foot support 121 to extend perpendicularly thereto in a downward direction parallel to the axis of the body tube.

Dispersement mechanism 113 provides operating lever bolt 137 extending through hole 136 and spacedly therebeyond toward the bottom portion of the tool. The operating lever bolt 137 movably supports operating lever 138 having outer handle-like portion 138a and an inner portion 138b extending through slot 146 defined in the body tube and into channel 115 in the upper portion of that tube. Extension spring 139 extends from the medial portion of the operating lever 138 outwardly of bolt 137 to the adjacent portion of the body tube to bias the outer portion of the operating lever in a downward direction toward the lower reservoir portion of the body tube.

Fastening notch 141, defines the inner end portion 138b of the operating lever, movably carries bent end portion 142 of elongate operating rod 143 to movably interconnect that rod. The operating rod 143 is of such configuration and dimension as to extend downwardly through channel 115 of the body tube to pivotally communicate with by bent portion 144 through a hole defined in operating rod connector 145 which is structurally carried on the upper surface of lower orifice door 127.

With this operating mechanism, the outer handle portion 138a of operating lever 138 may be manually moved toward handle cylinder 135 and grips 140 to cause the operating rod 143 to move downwardly and responsively move the lower orifice cover 127 to open by moving the lower part of its tapered portion 128 pivotally downwardly and away from the adjacent lower portion of the body tube.

Having thusly described the structure of my tool, its use may be understood.

The operation of either species of my tool is substantially the same. A tool is formed according to the foregoing specification and assembled as illustrated in either FIG. 1 or FIG. 5 of the drawings. The volume of the reservoir is adjusted to hold a desired quantity of fertilizer by appropriately positioning the reservoir adjustment tube. To fill the reservoir with granulated fertilizer, the tool is manually manipulated, generally by the upper handle structure, to insert the reservoir portion into a mass of granulated fertilizer having a depth at least as great as the vertical height of the upper reservoir opening. In the first species of tool, granulated fertilizer will flow by action of gravity through the open top of the reservoir tube and into the reservoir chamber until that chamber defined by channels 25 and 39 is filled. In the second species, the granulated fertilizer will enter the reservoir channel defined by body tube channel 115 and adjustment tube channel 130 through reservoir window 117 defined in the body tube. The tool then is removed from the fertilizer mass in a substantially upright orientation and then contains a measured amount of granulated material carried in the reservoir ready for placement.

Normally, the tool will not be inserted into a bulk supply of granular fertilizer substantially above the top of the reservoir input structure so that the foot support will not be in the fertilizer material. If the tool is inserted in granular material above the level of the foot support, that support may be folded back against the body or angulated to the body to prevent the accumulation of material in the upwardly opening channel defined by the support.

My tool after being loaded with granular fertilizer is manually moved to a position vertically above the area where the granular fertilizer is to be inserted. The tool is moved downwardly so that its lowermost portion rests in or on the surface of the earth where insertion is to be made. The foot support, if it is not already so positioned, is moved to its horizontal operative position so that it extends substantially perpendicularly from the tool body. A user's foot is then placed on the upper surface of the foot support and the lower reservoir portion of the tool is forced downwardly into the soil therebeneath by force generated on the foot support, on the handle structure or on both. Normally, it is easier for a user to apply insertion force by use of the foot support and most of such force usually is so applied. The lower portion of the tool is inserted into the soil generally to a point slightly above the top of the reservoir structure, though insertions may be made both above and below this position if desired to establish fertilizer at a particularly desired depth in the soil.

When the tool has been thusly inserted into the soil, it is raised slightly by manipulating the handle structure and the dispersement lever 34 or 138 is then operated. Normally the tool will be held by a user with the heel of one hand adjacent the upper portion of handle cylinder 22 or 135 and the fingers extending beneath and around the associated dispersement lever, so that that lever may be moved by tightening the fingers thereabout to cause pivotal motion toward the handle cylinder. As this occurs, the dispersement lever moves to cause a downward motion of dispersement rod 32 or 143. The downward motion of the dispersement rod is transmitted to reservoir door 26 or 127 to cause that door to pivot, with its lowermost portion moving pivotally away from the lowermost portion of reservoir tube 24 or 114. This door motion opens the reservoir tube lower orifice to allow granular material carried in the reservoir channel to move vertically downwardly by action of gravity into the hole in the soil formed by the original placement of the tool, before it was moved upwardly from its lowermost position. The tool is then manipulated by its handle structure, while maintaining the reservoir door open, to withdraw it from its position in the soil. As this is done, the granular fertilizer carried in the reservoir chamber will move through the open lower orifice of the reservoir to be deposited in the hole beneath the reservoir structure. When the tool is completely removed from the soil, any depression that is left may be covered by the user's foot by moving adjacent soil into the depression to cover the top of the fertilizer mass.

After injection of a mass of granular fertilizer as described, the grip on dispersement lever 34 or 137 is released and that lever moves away from handle 22 or 138 by reason of the spring-bias of the lever. This responsively closes the reservoir door 26 or 127 and the tool is ready for reuse to insert another portion of fertilizer as before described.

The foregoing description of my invention is necessarily of a detailed nature so that a specific embodiment of it might be set forth as required, but it is to be understood that various modifications of detail, rearrangement and multiplication of parts might be resorted to without departing from its spirit essence or scope.

Having thusly described my invention, what I desire to protect by Letters Patent, and

What I claim is:

1. A tool for placement of a single predetermined volume of granulated fertilizer beneath the surface of soil, comprising in combination:

an elongate rigid body with upper and lower end portions having a handle at the upper end portion of the body extending therefrom, and a foot support pivotally carried in the medial portion of the body to pivot from a first position adjacent the body to a second position substantially perpendicular to the body;

a reservoir, having an upper and a lower portion, carried by the lower end portion of the body, and having a central channel with means for measuring said single predetermined volume of granulated fertilizer, a lower orifice formed by an angulated lower end to define a knife-like curvilinear lower edge and a reservoir door, having a knife-like curvilinear peripheral edge, pivotally mounted on the lower portion of the reservoir to move from a first position covering the lower orifice to a second position not covering said orifice; and dispersement mechanism including an elongate dispersement rod articulatingly communicating from the upper surface of the reservoir door to a position spacedly below the handle, a dispersement lever pivotally carried on the body spacedly adjacent the handle and interconnected to the dispersement rod to move the dispersement rod in an axial direction responsive to pivotal motion of said dispersement lever, and means for biasing the dispersement lever to a position whereat the reservoir door closes the lower orifice of the reservoir but allows said door to be pivoted against its bias to open the lower orifice of the reservoir.

2. The tool of claim 1 further characterized by:

the means for measuring a single predetermined volume of granulated fertilizer comprising a tube, slidably carried in the channel defined by the the reservoir, having means for adjustable positioning relative to the reservoir to determine variable volumes for the reservoir.

3. The tool of claim 1 further characterized by:

the reservoir door carrying about its periphery at least two opposed alignment dogs extending upwardly a spaced distance on the reservoir to prevent skewing motion of the door relative to the pivotal mounting of the door on the lower portion of the reservoir.

4. A tool for placement of a single predetermined volume of granulated fertilizer beneath the surface of soil, comprising in combination, an elongate rigid body having an upper portion and tapered lower portion with smaller cross-sectional area of the tapered lower portion of the body lowermost, said body having a handle at the Upper portion of the body extending perpendicularly from the body, and a foot support, defining a channel to fit immediately adjacent the body, carried in the medial portion of the body to pivot in a vertical plane perpendicularly to the handle from a first position adjacent the body to a second position substantially perpendicular to the body;

a reservoir carried on the tapered lower portion of the body on the side opposite the side from which the handle extends, said reservoir extending spacedly below the body, comprising a tube defining a medial channel, to contain said single predetermined volume of granulated fertilizer, and having an open top and a planar orifice formed by an angulated lower end to define a knife-like curvilinear lower edge and carrying a door, having a knife-like curvilinear peripheral edge of similar configuration to the lower orifice pivotally mounted on the reservoir to move from a first position covering the lower orifice to a second position not covering said lower orifice; and dispersement mechanism including an elongate dispersement rod articulatingly communicating from the upper surface of the reservoir door to a position spacedly below the handle, a dispersement lever pivotally carried by the body spacedly adjacent the handle and interconnected to the dispersement rod to move the dispersement rod in an axial direction responsive to pivotal motion of the dispersement lever, and means for biasing the dispersement lever to a position whereat the reservoir door closes the lower orifice of the reservoir but allows the door to be pivoted against its bias to open the lower orifice of the reservoir.

5. The tool of claim 4 further characterized by: the means for measuring a single predetermined volume of granulated fertilizer comprising a tube slidably carried for adjustable positioning in the reservoir channel to determine variable volumes for the reservoir.

6. The tool of claim 4 further characterized by:

the reservoir door carrying about its periphery at least two spaced opposed alignment dogs extending upwardly a spaced distance on the reservoir tube to prevent skewing motion of the door relative to the pivotal mounting structure of the door on the lower portion of the reservoir.

7. A tool for placement of a single predetermined volume of granulated fertilizer beneath the surface of soil, comprising in combination:

an elongate rigid tubular body, with upper and lower end portions, having a handle at the upper end portion of the body extending on opposite sides of the body, and a foot support, defining a channel to fit adjacent the body, pivotally carried in the medial portion of the body to pivot in a plane parallel to the handle from a first position adjacent the body to a second position substantially perpendicular to the body;

a reservoir, in the lower end portion of the body, having a medial channel with an orifice defined in the body for material access at the upper portion of the reservoir and means for measuring said single predetermined volume of granulated fertilizer, a planar lower orifice formed by an angulated lower body end to define a knife-like curvilinear lower edge and a reservoir door, having a knife-like curvilinear edge, pivotally mounted on the body upwardly adjacent the lower orifice to move from a first position covering the orifice to a second position not covering the orifice; and dispersement mechanism including an elongate dispersement rod articulatingly communicating from the upper surface of the reservoir door through a channel defined in the tubular body to a position spacedly below the handle, a dispersement lever movably carried by the handle and articulatingly interconnected with the dispersement rod to move the dispersement rod in an axial direction responsive to motion of the dispersement lever and means for biasing the dispersement lever to a position whereat the reservoir door is closed but allowing the door to pivot against its bias to open the lower orifice of the reservoir.

8. The tool of claim 7 further characterized by: the means for measuring a single predetermined volume of granulated fertilizer comprising a tube slidably carried in the channel defined by the reservoir for adjustable positioning relative to the reservoir to allow variable volumes for the reservoir.

* * * * *